United States Patent [19]

Kornbichler

[11] Patent Number: 4,772,352

[45] Date of Patent: Sep. 20, 1988

[54] APPARATUS FOR MAKING CRISSCROSS-WOUND LAYERS TO FORM WOUND BODIES

[75] Inventor: Heinz Kornbichler, Königstein, Fed. Rep. of Germany

[73] Assignee: Uranit GmbH, Jülich, Fed. Rep. of Germany

[21] Appl. No.: 469,809

[22] Filed: Feb. 25, 1983

[30] Foreign Application Priority Data

Mar. 27, 1982 [DE] Fed. Rep. of Germany ....... 3211417

[51] Int. Cl.$^4$ .............................................. B65H 81/00
[52] U.S. Cl. .................................... 156/425; 156/175; 156/431; 156/446
[58] Field of Search ............... 156/169, 172, 173, 175, 156/363, 361, 166, 160, 162, 181, 441, 443, 433, 446; 425/425, 428, 429, 430, 431, 432; 242/7.22

[56] References Cited

U.S. PATENT DOCUMENTS

| | | | |
|---|---|---|---|
| 3,112,234 | 11/1963 | Krupp | 156/169 |
| 3,492,187 | 1/1970 | Hirtzer | 156/433 X |
| 3,616,070 | 10/1971 | Lemelson | 156/446 |
| 3,617,414 | 11/1971 | Wesch | 156/172 X |
| 3,629,028 | 12/1971 | McLarty | 156/175 |
| 3,775,219 | 11/1973 | Karlson et al. | 156/363 |
| 3,810,805 | 5/1974 | Goldsworthy et al. | 156/361 |
| 3,915,776 | 10/1975 | Kaempen | 156/161 |
| 4,292,108 | 9/1981 | Weiss et al. | 156/259 |
| 4,359,356 | 11/1982 | Kornbichler et al. | 156/175 |
| 4,381,960 | 5/1983 | Pinter et al. | 156/175 |

Primary Examiner—Michael Ball
Assistant Examiner—Ramon R. Hoch
Attorney, Agent, or Firm—Spencer & Frank

[57] ABSTRACT

An apparatus for making a rotationally symmetrical body formed of crisscross-wound layers, comprises a rotatable winding mandrel, a carriage arranged for travel back and forth along the mandrel; and a thread laying mechanism for receiving simultaneously a plurality of threads from a thread supply and for depositing the threads on the mandrel during rotation thereof and during the back-and-forth travel of the carriage. The thread laying mechanism has a laying roller having a peripheral surface void of grooves. The threads are trained about the peripheral surface of the laying roller and deposited therefrom onto the winding mandrel. The thread laying mechanism further has a guide element for receiving the threads and advancing them to the peripheral surface of the laying roller in predetermined distances from one another.

2 Claims, 4 Drawing Sheets

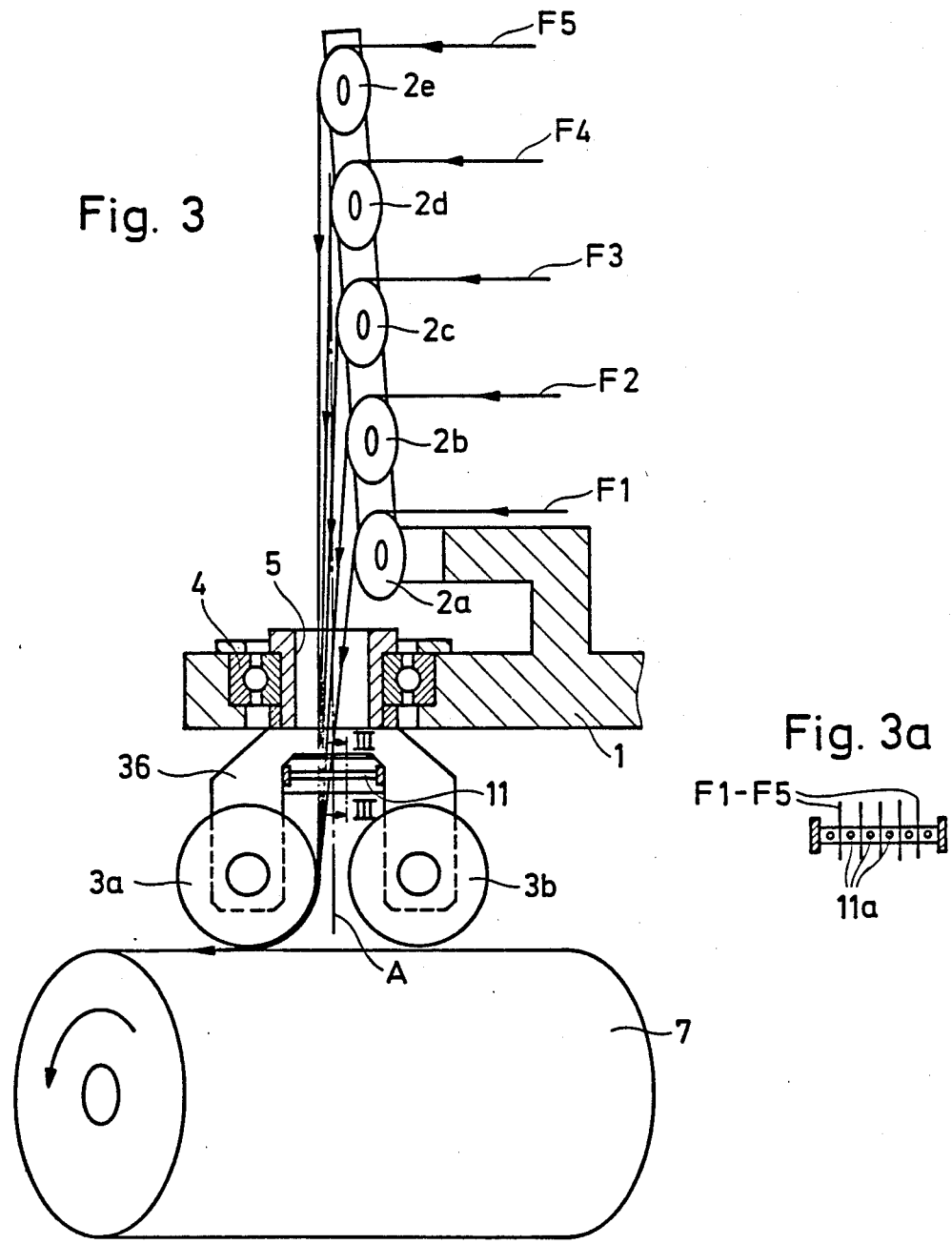
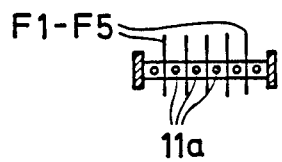
Fig. 3
Fig. 3a

APPARATUS FOR MAKING CRISSCROSS-WOUND LAYERS TO FORM WOUND BODIES

BACKGROUND OF THE INVENTION

This invention relates to an apparatus for making crisscross-wound layers to form fiber-reinforced, rotationally symmetrical wound bodies. The apparatus comprises a rotatable winding mandrel as well as a carriage travelling back and forth parallel to the mandrel axis. On the carriage there is mounted a thread guiding device and a pivotal thread laying mechanism which is provided with a laying roller or, in case of alternating thread laying, with a laying roller pair for depositing on the mandrel a plurality of threads impregnated with synthetic resin.

Wound bodies formed of threads, such as glass fiber, Kevlar fiber or carbon fiber threads and an adhesive, such as synthetic resin are formed, as a rule, by circumferentially wound or crisscross-wound layers.

The circumferentially wound layers, wherein the threads are deposited substantially in a circumferential direction on the winding mandrel with a relatively small feed of the carriage supporting the laying roller, result in a high strength in the circumferential direction of the body.

The crisscross-wound layers, wherein the threads are deposited on the mandrel in steep helices with a relatively large feed of the carriage supporting the laying roller, result in a high strength of the wound body in the axial direction as well as in a high bending strength. The helical crisscross windings are usually deposited in laying angles of approximately $\alpha = 45°$ to $90°$, as measured in the circumferential direction of the mandrel. Since helical windings have to be applied in both directions, positive and negative winding angles appear.

In the continuous crisscross winding process the mandrel is rotated with an approximately constant speed whereas the carriage which supports the thread laying roller is reciprocated along the winding mandrel. In this manner, there is obtained, during forward travel of the carriage, a thread laying helix with a winding angle $+\alpha$ and during the return travel of the carriage there is obtained a winding angle of $-\alpha$.

At the ends of the winding mandrel the thread or threads pass over the end caps of the winding mandrel. During this occurrence the thread laying roller has to pivot through an angle of $2\alpha$ or, in case of alternating laying by means of a thread laying roller pair, the rollers have to pivot through an angle of $2(90° - \alpha)$.

A thread laying system including a pivotal laying roller pair for an individual thread is disclosed in U.S. Pat. No. 4,359,356 issued Nov. 16, 1982. As shown in FIG. 5 of the patent, the thread is advanced approximately perpendicularly to the winding mandrel axis to a guide roller which is mounted on the outer circumference of a frame affixed to a carriage. The frame is provided with an aperture in which a hollow shaft oriented towards the winding mandrel is pivotally mounted. The thread laying roller pair is carried at the end of the hollow shaft. The thread running from the guide roller passes through the hollow shaft and is alternately deposited on the winding mandrel by one and the other laying roller.

In case of thread laying with a single laying roller as well as in case of thread laying with a laying roller pair, the pivotal motion of the roller or rollers at the end of the mandrel as well as the correct positioning of the roller or rollers during thread laying is effected solely by the tension of the running thread. Such an arrangement, however, is stable in principle only if the pivotal system includes a device which ensures that the threads always run onto the laying roller at the same location. Only then it is ensured that the running thread always sets the rollers in the correct orientation by means of the thread tension. In the simplest case such a stabilizing device is a groove provided in the laying roller for each thread. These grooves ensure that the threads run correctly onto the laying roller.

In case of laying several threads, between the grooves of the laying roller webs are necessarily provided which prevent the threads from sufficiently "flattening out" (spreading) on the laying roller. This limits the maximum width-wise expansion of the threads on the winding mandrel. Thus, the webs are "reproduced" on the winding mandrel, so that instead of a desired smooth surface configuration the deposited layers have a wavy surface.

SUMMARY OF THE INVENTION

It is an object of the invention to provide an improved apparatus of the above-outlined type by means of which a plurality of threads can be guided in a precise manner, that is, they may be maintained in a predetermined distance from one another and can be laid on the winding mandrel such that a smooth wound layer surface is obtained.

This object and others to become apparent as the specification progresses, are accomplished by the invention, according to which, briefly stated, the laying roller has a grooveless circumferential surface for receiving the threads to be deposited and the pivotal thread laying mechanism includes a guide element which advances the threads in the desired distance from one another to the grooveless surface of the laying roller.

As a result of the invention as outlined above, each thread is spread in such a manner that it forms, even prior to reaching the winding mandrel, a flat band of predetermined width.

BRIEF DESCRIPTION OF THE DRAWING

FIG. 3 is a schematic side elevational view, partially in section, of still another preferred embodiment of the invention.

FIG. 3a is a sectional view along line III—III of FIG. 3.

DESCRIPTION OF THE PREFERRED EMBODIMENTS

Figure 1:
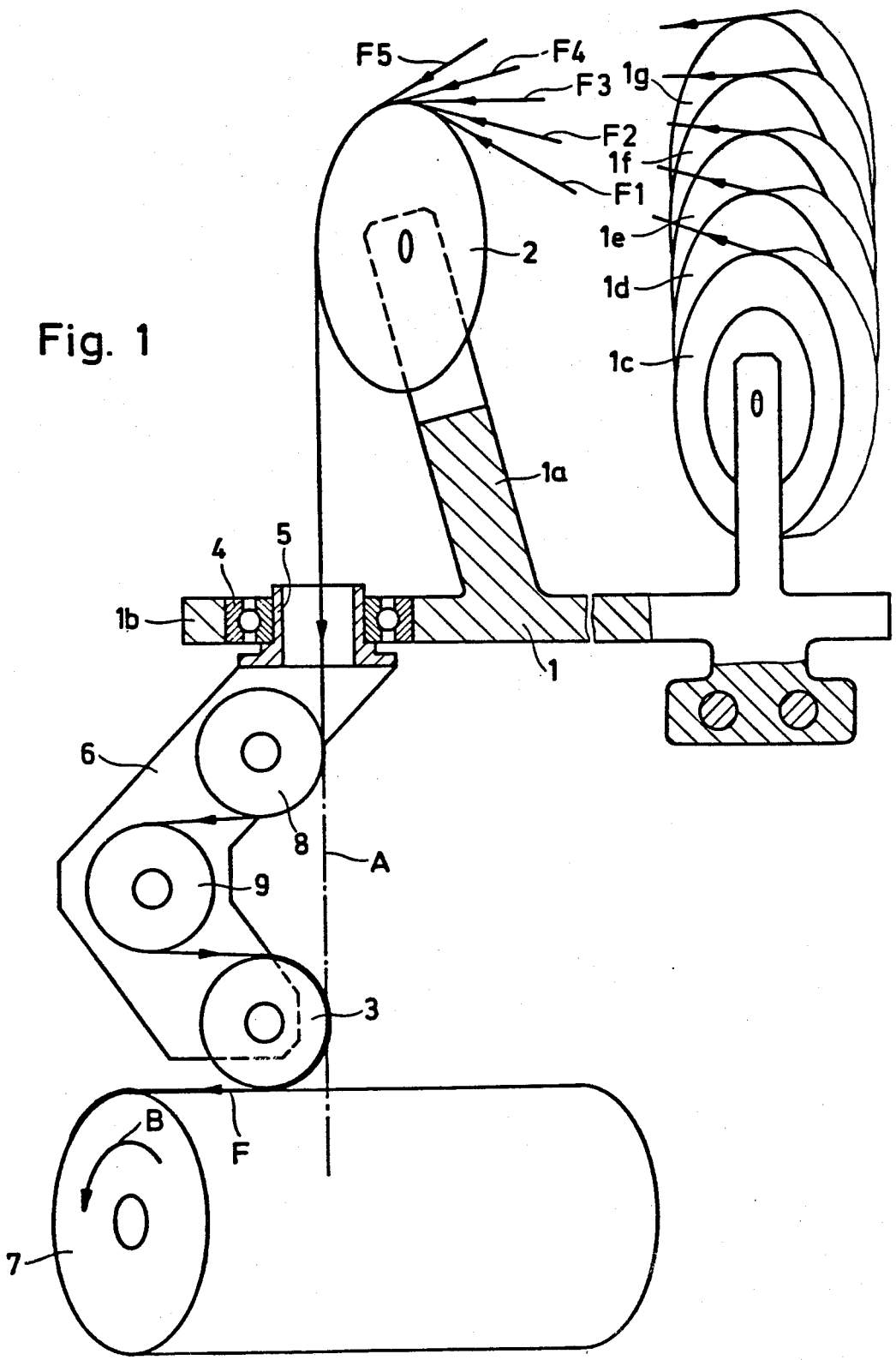
FIG. 1 is a schematic side elevational view, partially in section, of a preferred embodiment of the invention.

Turning now to FIG. 1, the apparatus shown therein includes a thread guiding device mounted on a carriage and comprising a carrier 1 including a first arm 1a on which there is rotatably mounted a thread collector and guide roller 2. The carrier 1 has a further arm 1b provided with an opening accommodating a ball bearing 4 whose inner race tightly surrounds a sleeve 5. To the sleeve 5 there is affixed a roller support 6 on which there are mounted three rollers 3, 8 and 9. As will be described in connection with FIG. 4, the roller 8 is provided with circumferential grooves while the rollers 3 and 9 have a grooveless circumferential surface whose width corresponds to the desired total width of the threads to be deposited simultaneously.

The individual threads $F_1$, $F_2$, $F_3$, $F_4$ and $F_5$ are advanced from supply reels $1c$, $1d$, $1e$, $1f$, $1g$ to a separate groove in the guide roller 2 and after deflection by the guide roller 2, the threads are passed through the sleeve 5 parallel to the pivotal axis A of the roller carrier 6 and are advanced to the roller 8 whose periphery is tangent to the pivotal axis A. By means of the subsequent roller 9, the threads form a loop of approximately 180° before they describe a further loop as they pass around the laying roller 3. On the laying roller 3 the threads are each spread (expanded) in such a manner that they together form a flat thread band F before they are deposited on a winding mandrel 7 which rotates in the direction indicated by the arrow B. The purpose of the intermediate roller 9 is to increase the number of deflections to which the threads are submitted to thus enhance the spreading effect.

Figure 2:
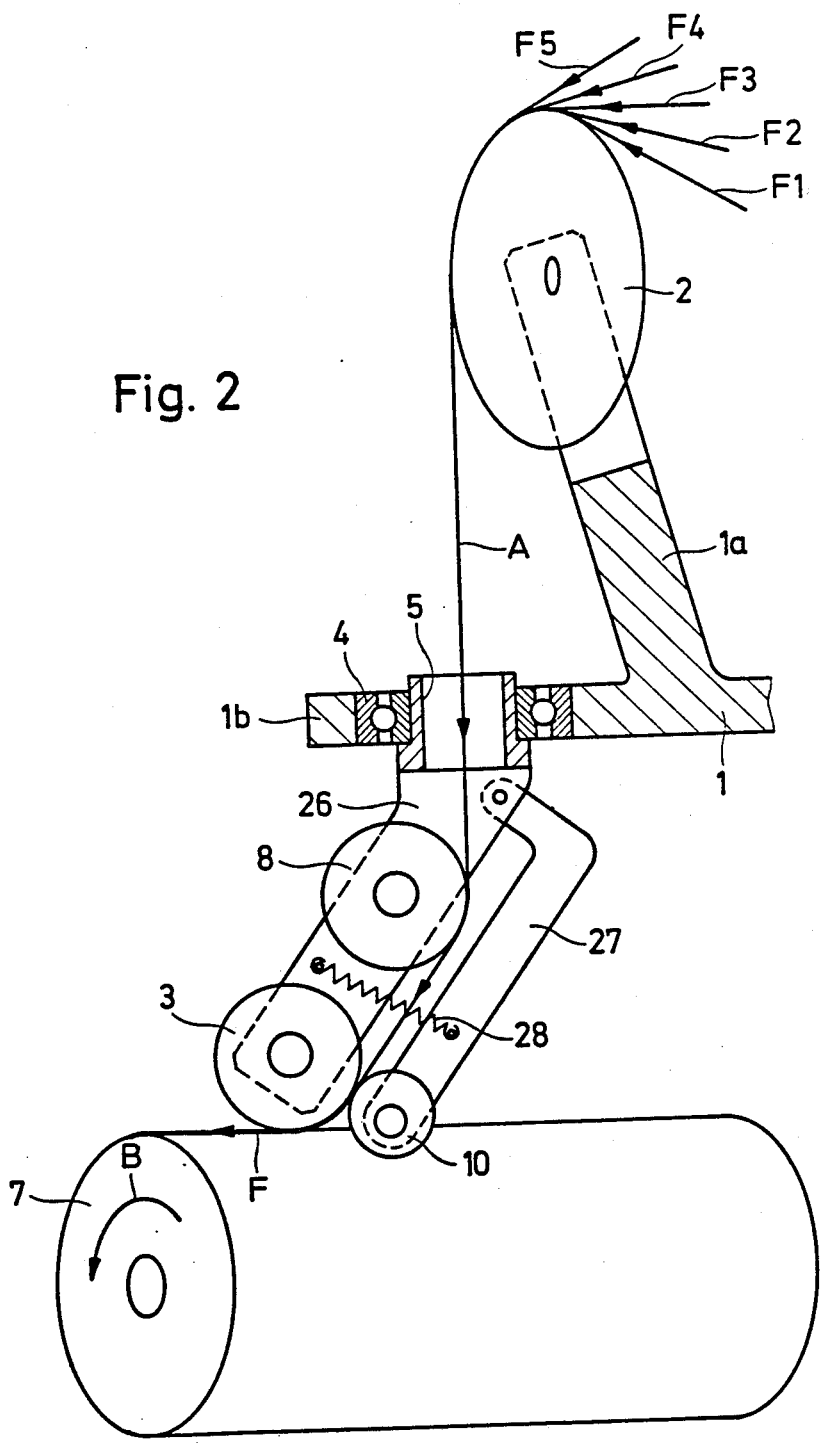
FIG. 2 is a schematic side elevational view, partially in section, of another preferred embodiment of the invention.

Turning now to FIG. 2, to the sleeve 5 there is affixed a carrier 26 which is arranged at an inclination to the axis A and to which there is secured a grooved guide roller 8 and a grooveless laying roller 3 which cooperates with a pressing roller 10 mounted at an end of a lever 27 which, in turn, is pivoted to the carrier 26. The lever 27 is urged to pivot towards the carrier 26 by means of a tension spring 28 attached at its ends to the arm 27 and the carrier 26. The diameter of the pressing roller 10 is smaller than that of the roller 3 in order to achieve high pressures. In this manner, the spreading of the threads is further enhanced as compared to the embodiment shown in FIG. 1.

Turning now to FIG. 3, the embodiment shown therein includes a laying roller pair formed of laying rollers $3a$ and $3b$ which are mounted at the ends of a forked carrier 36 mounted on the sleeve 5. The threads $F_1$ through $F_5$ are deflected by the individual rollers $2a$, $2b$, $2c$, $2d$ and $2e$ and passed through the sleeve 5. A comb-like element 11 situated in the space defined by the fork tines of the carrier 36 is provided as a stabilizing and guide element for positioning the threads on the grooveless laying rollers $3a$, $3b$ at the proper spacing and orientation. As seen in FIG. 3a, the individual bars or tines $11a$ forming the comb-like element 11 guide the threads $F_1$–$F_5$ and maintain them spaced from one another and ensure their correct orientation.

Figure 4:
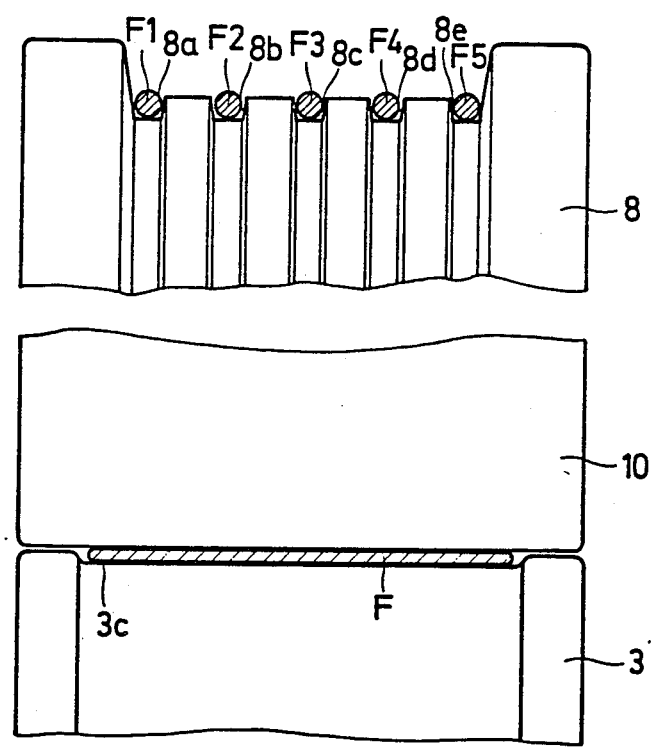
FIG. 4 is an enlarged fragmentary front elevational view of three components of the structure shown in FIG. 2.

Turning now to FIG. 4, there are shown the rollers 3, 8 and 10 in a view taken perpendicularly to their respective longitudinal axes. The roller 8, as noted earlier, has a plurality of grooves $8a$, $8b$, $8c$, $8d$ and $8e$ corresponding to the number of threads $F_1$ through $F_5$. These grooves guide the respective threads and advance them in a stabilized manner to the laying roller 3. The latter has a circumferential working surface $3c$ whose width corresponds to the desired width of the thread band F while the pressing roller 10 has a throughout smooth circumferential surface extending over the entire axial width of the working surface $3c$. By virtue of the cooperation between the laying roller 3 and the pressing roller 10, the threads between the two rollers may be spread to such an extent, that is, they may be flattened in their cross section such that a subsequent spreading step on the winding mandrel is generally not necessary.

It will be understood that the above description of the present invention is susceptible to various modifications, changes and adaptations, and the same are intended to be comprehended within the meaning and range of equivalents of the appended claims.

What is claimed is:

1. An apparatus for making a rotationally symmetrical body formed of crisscross-wound layers, comprising
   (a) a winding mandrel rotatable about a longitudinal axis thereof;
   (b) a carriage arranged for travel back and forth along said mandrel;
   (c) thread supplying means; and
   (d) thread laying means for receiving simultaneously a plurality of thread from said thread supplying means and for depositing said threads on said mandrel during rotation thereof and during the back-and-forth travel of said carriage; said thread laying means including
      (1) a laying roller having a peripheral surface having a working width being void of grooves and corresponding to a desired width of the layers deposited on said winding mandrel; said threads being supplied to said laying roller and trained about the peripheral surface thereof and deposited therefrom onto the winding mandrel;
      (2) an additional roller having a peripheral surface void of grooves and extending along said working width in the entirety thereof;
      (3) means for pressing the peripheral surface of said additional roller to the peripheral surface of said laying roller for spreading the plurality of threads on said working width into a single flat-thread band and
      (4) a guide roller for receiving said threads and advancing said threads to the peripheral surface of said laying roller in predetermined distances from one another.

2. An apparatus as defined in claim 1, wherein said guide roller has a peripheral surface and separate, spaced circumferential grooves in the peripheral surface of said guide roller; each groove receiving a separate one of said threads for advancing said threads to said peripheral surface of said laying roller.

* * * * *